United States Patent [19]

Shumyakin et al.

[11] 4,180,435
[45] Dec. 25, 1979

[54] REFUELLING MACHINE FOR NUCLEAR REACTOR

[76] Inventors: Evgeny P. Shumyakin, ulitsa Petra Smorodina, 8, kv. 58; Konstantin I. Sabir-de-Ribas, Piskarevsky prospekt, 39, kv. 256; Isaak A. Druzhinsky, Moskovsky prospekt, 184, kv. 12; Gennady P. Shishov, ulitsa Kurchatova, 4, kv. 89; Boris I. Andreichikov, Chkalovsky prospekt, 36, kv. 27, all of Leningrad, U.S.S.R.

[21] Appl. No.: 800,289

[22] Filed: May 25, 1977

[51] Int. Cl.$^2$ .................. G21C 19/20; B66C 17/08
[52] U.S. Cl. ........................... 176/30; 414/146
[58] Field of Search ............... 176/30, 31, 32; 214/18 N

[56] References Cited

U.S. PATENT DOCUMENTS

| | | | |
|---|---|---|---|
| 3,915,792 | 10/1975 | Aubert | 176/30 |
| 3,937,332 | 2/1976 | Flessner | 176/30 |
| 3,994,775 | 11/1976 | Spurrier | 176/30 |

Primary Examiner—Charles T. Jordan
Assistant Examiner—Donald P. Walsh
Attorney, Agent, or Firm—Fleit & Jacobson

[57] ABSTRACT

The proposed manipulating means comprises a sealed housing, wherein a gripping means is arranged to grip a fuel assembly being transferred. The gripping means is coupled to a drive having a chain which is in contact with a sprocket mounted on an axle arranged in the sealed housing. The driving force of the drive is transmitted to the gripping means. The driving force is controlled by a force regulator mounted on the gripping means. The force regulator comprises two force transducers mounted on the sealed housing, and a spring suspension member installed in the gripping means. Some clearance is allowed where the drive sprocket axle is secured in the walls of the sealed housing. The ends of the axle extend outside the sealed housing and are coupled to sensitive elements of the force transducers.

20 Claims, 7 Drawing Figures

REFUELLING MACHINE FOR NUCLEAR REACTOR

The present invention relates to nuclear engineering and, more particularly, to manipulating means of refuelling machines for all types of reactors.

An important problem in handling fuel assemblies of nuclear reactors with the aid of remote-control refuelling machines is the necessity of continuously controlling the forces applied to the gripping means in order to avoid damage of a fuel assembly which may occur in the course of removing fuel assemblies from the reactor core or installing them in the reactor core. It is essential that the means to control the force applied to the gripping means should operate reliably for a long time without periodic checks or maintenance. It should also be borne in mind that during operation the means for controlling the forces applied to the gripping means is exposed to the effects of the working medium whose parameters fluctuate considerably in the course of refuelling.

There is known a manipulating means of a refuelling machine for a nuclear reactor, comprising a sealed housing, wherein there is arranged a gripping means coupled to a drive having a chain which is in contact with a sprocket mounted on an axle installed in the sealed housing. The driving force of the drive is transmitted to the gripping means.

The chain, which transmits the force to the gripping means, is composed of two runs, at whose ends there is arranged the gripping means. The runs are on the left and right sides of the line of travel of the gripping means and are constructed so that when engaged with its sprocket, each run is bent to only one side; however, when joined together, the two runs make up a rigid rod capable of transmitting the gripping force to the gripping means when a fuel assembly is placed in the reactor core.

If a fuel assembly is jammed as it is being placed in the reactor core or removed therefrom, the manipulating means under review does not guarantee that the fuel assembly will remain intact, since it is not provided with a means to control the forces applied to the gripping means and disconnect the drive of the gripping means if these forces are in excess of the maximum permissible values for the fuel assembly being transferred.

In addition, if a fuel assembly is jammed as it is being placed in the reactor core, to the gripping means there is applied, apart from the force developed by the drive of the gripping means, an additional load which is the weight of the chain portion between the sprocket and the gripping means. As the fuel assembly is being placed in the reactor core, this additional load varies and reaches its maximum value at a moment a pushing force is applied to the fuel assembly before it is completely installed in the reactor core.

There is known a manipulating means of a refuelling machine for a nuclear reactor, which partially eliminates the above disadvantages.

This manipulating means comprises a sealed housing, wherein there is arranged a gripping means coupled to a drive having a chain which is in contact with a sprocket mounted on an axle installed in the sealed housing. The drive transmits a force to the gripping means, whose value is controlled by controlling the gripping force of the gripping means.

The chain, which transmits the force to the gripping means, is similar to that of the previously discussed manipulating means. In this case, however, each run of the chain has an guide sprocket of its own. The guide sprockets are mounted on a common slider arranged in the sealed housing, between the drive sprockets, whereas the slider itself is coupled to a mechanism for compensating the weight of the circuit and carries a device to control the force applied to the gripping means. For this purpose, the weight compensation mechanism is constructed as a spring-loaded screw member arranged in the sealed housing and coupled by means of a three-step gear drive to one of the guide sprockets mounted on the slider. One element of the screw member (a thread) is provided on the output shaft of the last step of the three-step gear drive; the second element of the screw member (a second thread) is provided on a nut embracing the output shaft of the last step of the three-step gear drive and coupled to the sealed housing by means of a sliding key joint. In addition, the sealed housing has a protrusion, against which abuts a spring installed between this protrusion and the lower end face of the nut embracing the output shaft of the last step of the three-step gear drive.

The output shaft of the last step of the three-step gear drive is hollow and houses a rod arranged coaxially with the output shaft. One end of the rod is attached to the slider, whereas at its other end the rod carries the force regulator to control the force applied to the gripping means. The force regulator comprises a gear rack meshed with a gear wheel mounted on a separate axle installed in the sealed housing and connected to a limit switch of the control circuit of the electromotor of the gripping means' drive. On the portion of the rod, located between the place where it is connected to the slider and the gear rack, there is provided a shoulder which is in contact with the upper end face of the output shaft of the three-step gear drive.

The manipulating means under review operates as follows. As the drive sprockets rotate towards each other, the gripping means and the fuel assembly it holds move down into the reactor core. The fuel assembly first moves under gravity, so the drive of the gripping means only serves to hold the fuel assembly. It would seem that the slider is to be forced down under the weight of the chain runs, which would actually be the case unless the slider was connected to the sealed housing through the chain weight compensation mechanism. Rotation of the guide sprocket is transmitted through the three-step gear drive to the output shaft of this gear drive. Rotation of the output shaft is converted into advance motion of the nut, which compresses the spring.

The spring is selected so that its compression corresponds to the load increment produced by the moving runs of the chain. This means that the slider remains stationary with respect to the sealed housing; consequently, there is no movement of the rod, and no movement of the gear rack, provided at the end of the rod, with respect to the gear wheel connected to the limit switch of the control circuit to control the drive electromotor of the gripping means. Thus the operating principle of the mechanism for compensating the weight of the chain is based on preventing the downward movement of the slider under the weight of the chain runs due to the compression of the spring through which the slider is coupled to the sealed housing.

Proper functioning of the mechanism for compensating the weight of the chain requires accurate coordination of the operation of this mechanism with that of the regulator of force applied to the gripping means, due to which the manipulating means design becomes too complicated. At the same time the design of the weight compensation mechanism does not ensure the desired accuracy of compensating the varying weight of the chain; hence, the reliability of this mechanism is not as high as it should be.

The mechanism for compensating the weight of the chain is arranged in the sealed housing, wherein there are fluctuations of the parameters of the working medium, and even the working medium itself may be changed. This causes substantial changes in the friction coefficient and affects the operating conditions of the screw member of the mechanism for compensating the weight of the chain; as a result, the screw member may be jammed. These factors also lead to rapid wear of the working surfaces of the screw and the nut, i.e. to increasingly uncoordinated operation of the mechanism for compensating the weight of the chain and that of the regulator of force applied to the gripping means.

Besides, the use of four sprockets accounts for increased dimensions of the manipulating means and, consequently, increased dimensions of the sealed housing.

Non-uniform motion of the chain runs, and the drive and guide sprockets during a turn of the sprockets through one angle pitch results in a non-uniform fatigue breakdown of components of the chain runs and non-uniform stretching of these components, which results in a non-uniform increase in the pitch. These factors result in vibrations of the mechanism for compensating the weight of the chain with respect to the sealed housing; these factors may also cause skewing of this mechanism in relation to the sealed housing and thus lead to jamming of the gear rack and the gear drive of the regulator of forces applied to the gripping means. The ultimate result may be a breakdown or misoperation of the force regulator.

Besides, in the manipulator under review, the regulator of forces applied to the gripping means is only intended to regulate the pushing force transmitted by the drive, i.e. the force applied to a fuel assembly as it is being installed in the reactor core. However, the force regulator does not control the force applied to the gripping means as a fuel assembly is being withdrawn from the reactor core.

It is an object of the present invention to provide a manipulating means of a refuelling machine for a nuclear reactor, which would make it possible to continuously control the forces applied to the gripping means as a fuel assembly is being installed in the reactor core or removed therefrom.

It is another object of the invention to provide a manipulating means of a refuelling machine for a nuclear reactor, which would ensure accurate control of forces applied to the gripping means.

The foregoing objects are attained by providing a manipulating means of a refuelling machine of a nuclear reactor, comprising a sealed housing, wherein there is arranged a gripping means to grip a fuel assembly to be handled, which gripping means is coupled to a drive having a chain which is in contact with a sprocket mounted on an axle arranged in the sealed housing, which drive transmits a driving force to the gripping means, the force being controlled by a regulator of forces applied to the gripping means, which manipulating means is characterized, according to the invention, by that the regulator of forces applied to the gripping means comprises two force transducers mounted on the sealed housing and a spring suspension member installed in the gripping means, some radial clearance being allowed at the place where the drive sprocket is installed in the walls of the sealed housing, the ends of the axle extending outside the sealed housing and being coupled to sensitive elements of the force transducers.

It is expedient that the proposed manipulating means of a refuelling machine for a nuclear reactor should include a means to transmit the torque from the driving member of the drive to its sprocket, said torque transmitting means being arranged coaxially with and at some radial clearance relative to the sprocket and having a radial slot on its surface facing the sprocket, whereas on the surface of the sprocket, facing the torque transmitting means, there are mounted two fingers to be received in the slot of the torque transmitting means, the width of the slot being greater than the diameter of one finger by the width of the radial clearance.

The ends of the sprocket axle may be connected to the sensitive elements of the force transducers by means of sockets receiving the protruding ends of the axle, the outer surface of the sockets being rigidly coupled to the sensitive elements, whereas their open end faces are coupled to the sealed housing by means of flexible elements.

It is desirable that the spring suspension member should include a rod, one of whose end faces is connected to one of the ends of the drive chain, the rod carrying a spring placed in two sockets facing each other with their open ends, there being some clearance between the sockets, whose width is equal to the value of the compression of the spring under the weight of the gripping means, the bottom of one of the sockets being in contact with the gripping means.

The spring suspension member may include another spring successively mounted with the first spring on the rod and developing a force which is somewhat in excess of the permissible force with which a fuel assembly is removed from the reactor core.

The spring suspension member may also include a third spring, mounted on the rod between the end of the drive chain and the end face of the gripping means, and developing a force which is somewhat in excess of the permissible force with which a fuel assembly is installed in the reactor core.

The proposed design of a manipulating means of a refuelling machine for a nuclear reactor ensures reliable installation of a fuel assembly in the reactor core, as well as its removal therefrom. In addition, the proposed manipulating means is simple in design, highly reliable and easy to operate.

The objects and advantages of the present invention will become more apparent from the following detailed description of preferred embodiments thereof to be read in conjunction with the accompanying drawings, wherein.

Figure 1:
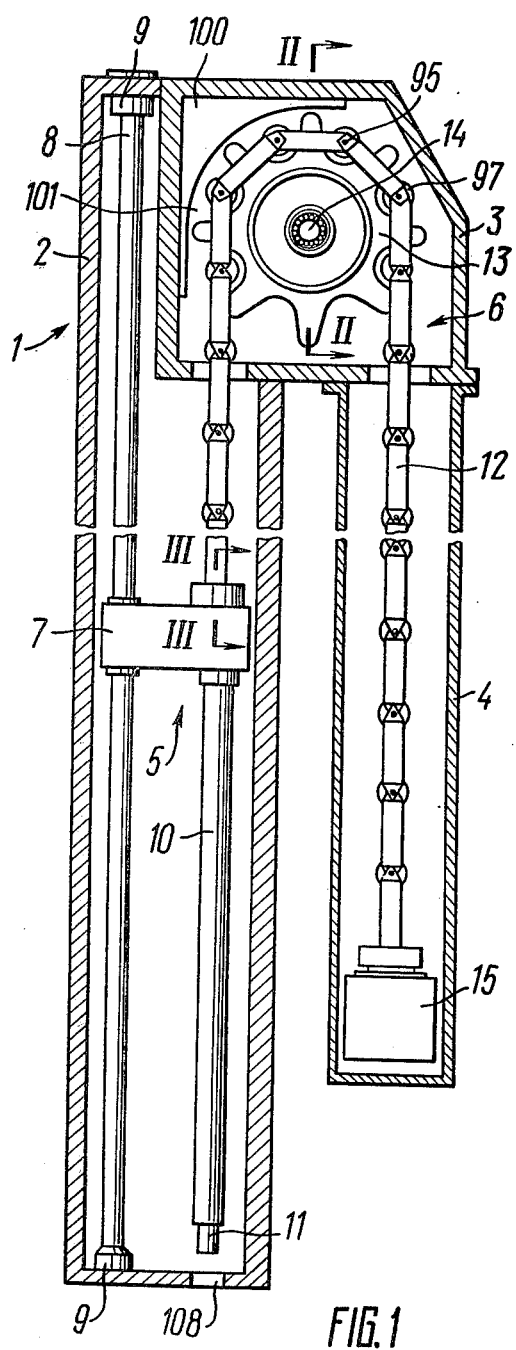
FIG. 1 is an elevation view of a manipulating means of a refuelling machine for a nuclear reactor, in accordance with the invention.

Referring now to the attached drawings, the proposed manipulating means of a refuelling machine for a nuclear reactor comprises a common sealed housing 1 (FIG. 1) composed of individual housings 2, 3 and 4, wherein there are arranged a gripping means 5, a first part of a drive 6, and a second part of the drive 6, respectively.

The gripping means 5 includes a trolley 7 movable on a guide 8 on bearings supports 9 in the housing 2. The trolley 7 carries a bar 10 with a grip 11 to grip a fuel assembly being handled (not shown).

The drive 6 comprises a chain 12 which is partially located in the housings 2, 3 and 4 and is in contact with a sprocket 13 mounted on an axle 14. The sprocket 13 and axle 14 are both arranged in the housing 3.

Figure 2:
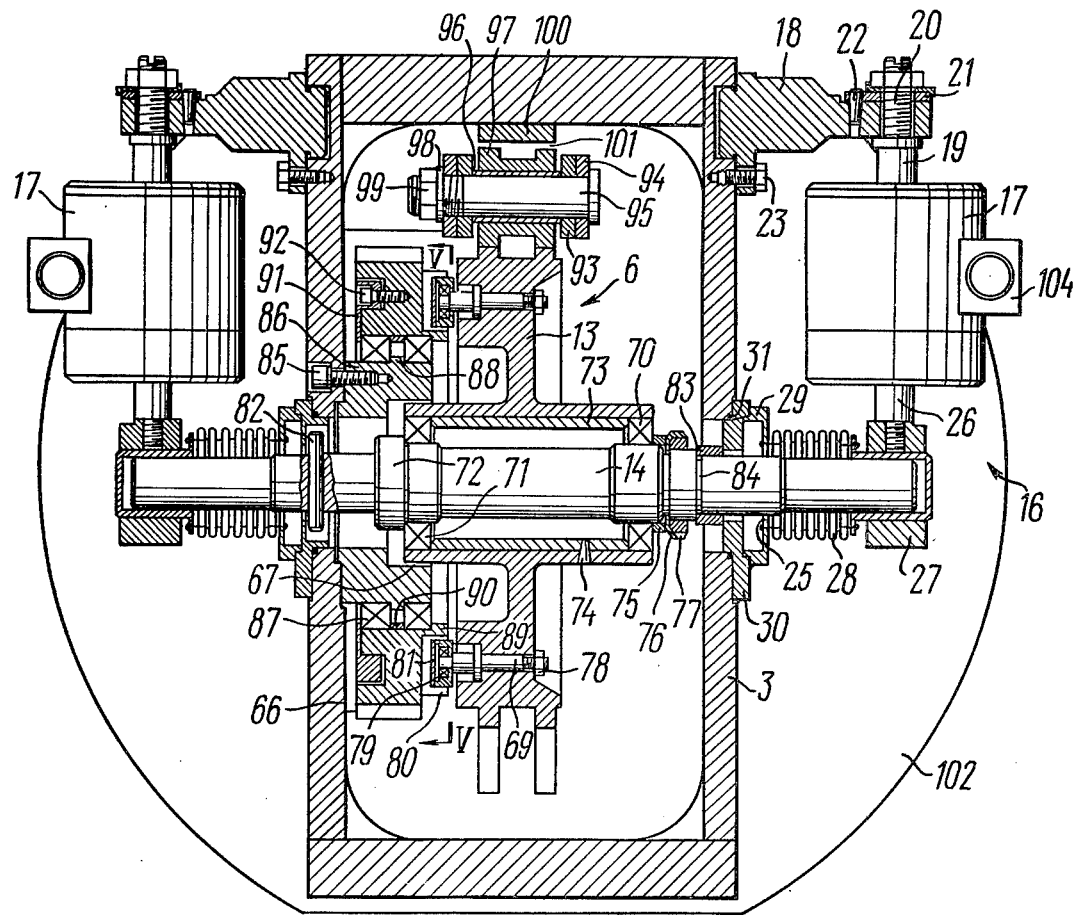
FIG. 2 is a section taken on the line II—II of FIG. 1.

In the housing 4, there is disposed a counterweight 15 for the gripping means 5, which is attached to one of the ends of the chain 12 (the first end), The drive 6 transmits its driving force to the gripping means 5. The force is controlled by a means 16 (FIG. 2) for regulating the forces applied to the gripping means 5 (FIG. 1).

The means 16 (FIG. 2) for regulating the forces applied to the gripping means 5 comprises two force transducers 17 mounted on the housing 3 with the aid of brackets 18, where to there are secured rod 19 of the transducers 17. The rods 19 are secured to the brackets 18 with the aid of screws 20 and gaskets 21 with pins 22. The brackets 18 are attached to the housing 3 with the aid of screws 23.

Figure 3:
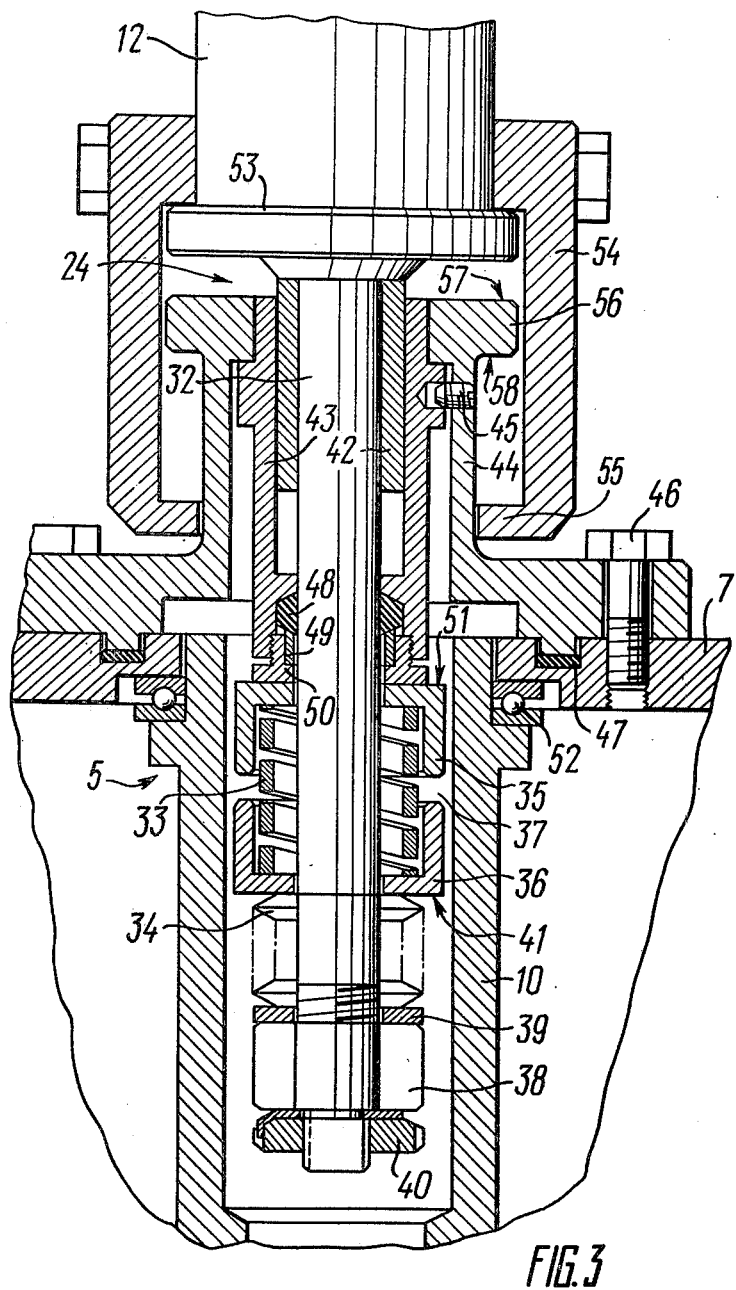
FIG. 3 is a section taken on the line III—III of FIG. 1.

The means 16 further includes a spring suspension member 24 (FIG. 3) installed in the gripping means 5 and connecting the gripping means 5 to the opposite end of the chain 12 (the second end). Some radial clearance 25 is allowed where the axle 14 (FIG. 2) of the sprocket 13 is installed in the walls of the housing 3 (the sealed housing 1). The clearance 25 is about 3 to 4 mm.

The ends of the axle 14 extend outside the housing 3 and are coupled to sensitive elements 26 of the force transducers 17. The latter are the widely known wire-strain gauges of the bridge type. The ends of the axle 14 are connected to the sensitive elements 26 by means of sockets 27 receiving the protruding ends of the axle 14. The outer surface of the sprocket 27 is rigidly coupled to the sensitive elements 26, whereas their open ends are coupled to the housing 3 (the sealed housing 1) by means of flexible elements 28 which are bellows. The clearance 25 is ensured by annular members 29 and 30 attached with rubber sealing rings 31 to the housing 3.

The spring suspension member 24 (FIG. 3) comprises a rod 32, one of whose end faces is secured to the second end of the chain 12. On the rod 32 there are successively mounted two springs 33 and 34. The spring 33 is less stiff then the spring 34.

The spring 33, which is less stiff, is arranged in two sockets 35 and 36 facing each other with their open ends. Between the sockets 35 and 36 there is a clearance 37 whose width is equal to the value of compression of the spring 33 under the weight of the gripping means 5. For example, if the weight of the gripping means is 300 kg, the compression of the spring 33 is 8 mm.

To eliminate the play, the stiffer spring 34 is compressed at one end by a nut 38 with a washer 39 and a lock-nut 40. The opposite end of the spring 34 abuts against a bottom 41 of the socket 36. The spring 34 develops a force which is somewhat in excess of the permissible force with which a fuel assembly is removed from the reactor core. For example, if the force with which a fuel assembly is removed from the reactor core is 1,000 kg, the force developed by the spring 34 is 1,200 kg.

The rod 32 is installed in the gripping means 5 with the aid of a bushing 42 which encompasses the rod 32. The bushing 42 is, in turn, movably arranged in a bushing 43. The latter is secured to a socket 44 by means of six screws 45 (one screw is shown). The socket 44 is attached to the trolley 7 by means of six screws 46. Placed between the socket 44 and the trolley 7 is a sealing ring 47. Placed between the bushing 43 and the rod 32 is a sealing rig 48 which abuts against a bushing 49 tightened by a nut 50. A bottom 51 of the sockets 35 is in contact with the end face of the nut 50.

The trolley 7 is connected to the bar 10 by means of bearing supports, of which only the upper support 52 is shown in the drawings.

On the second end of the chain 12 there is provided a shoulder 53 which is integral with the chain 12. Attached to said shoulder 53 is the bushing 42 of the spring suspension member 24. Above the shoulder 53, to the chain 12 there is attached a holder 54 composed of two portions, each having a band 55.

At its upper portion, the socket 44 has a shoulder 56 with two supporting surfaces, an upper surface 57 and a lower surface 58. The distance between the band 55 and the lower supporting surface 58 of the shoulder 56 is somewhat greater than the compression value of the spring 34 as a fuel assembly is being removed from the reactor core; the distance between the shoulder 53 and the upper supporting surface 57 of the shoulder 56 is greater than the width of the clearance 37.

Figure 4:
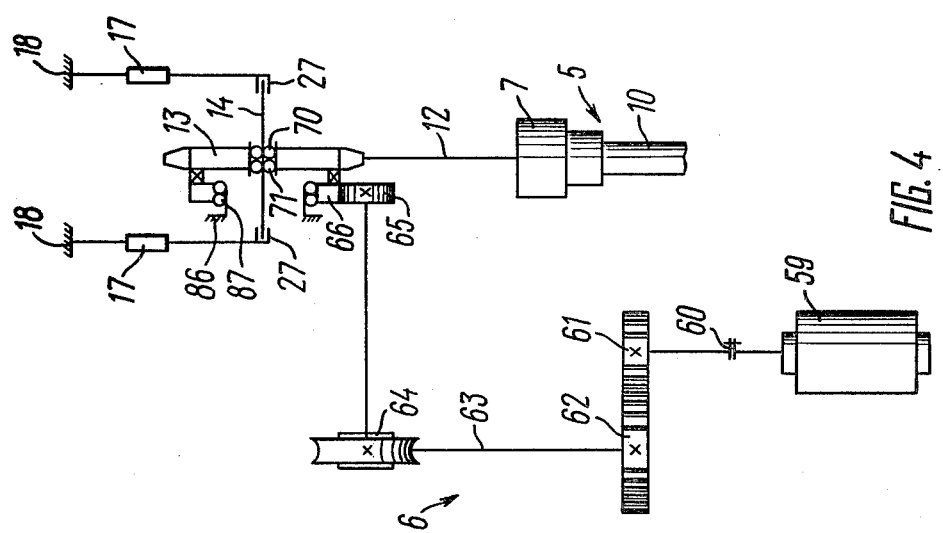
FIG. 4 is a diagram of the manipulating means drive in accordance with the invention.

As indicated above, the drive 6 (FIG. 1) comprises the chain 12 with the sprocket 13 mounted on the axle 14. The drive 6 (FIG. 4) further includes an electromotor 59 whose output shaft is coupled through a coupling 60 to a gear wheel 61 which, in turn, is coupled to a gear wheel 62. The latter is coupled through a shaft 63 to a worm gear 64. The worm gear 64 is connected to a driving member 65 which is a gear. The driving member 65 is meshed with a torque transmitting means 66 to transmit the torque from the driving member 65 to the sprocket 13.

The means 66 is a gear arranged coaxially with and at some radial clearance 67 (FIG. 2) relative to the sprocket 13. The width of the clearance 67 is equal to that of the clearance 25, i.e. it is about 3 to 4 mm.

Figure 5:
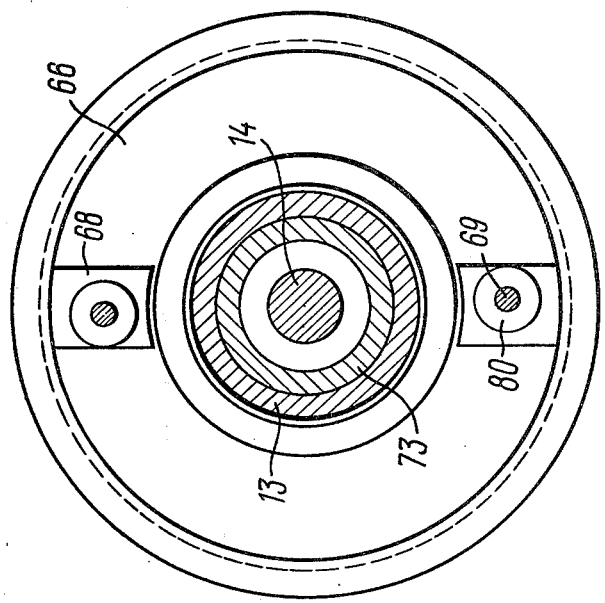
FIG. 5 is a section taken on the line V—V of FIG. 2.

On its surface facing the sprocket 13, the means 66 is provided with a radial slot 68 (FIG. 65). On the surface of the sprocket 13 (FIG. 2), facing the means 66, there are mounted, at two diametrically opposite points, two fingers 69 received in the slot 68 (FIG. 5). The width of the slot 68 is greater than the diameter of one finger 69 by the width of the radial clearance 67.

The sprocket 13 (FIG. 2) is mounted on the axle 14 in bearings 70 and 71. The bearing 71 abuts against a shoulder 72 provided on the axle 14. Placed between the bearings 70 and 71 is a bushing 73 secured in the sprocket 13 by a pin 74. The bearing 70 is tightened by a ring 75 and a nut 76 with a lock washer 77.

The finger 69 is secured by a nut 78 to the end face of the sprocket 13. On the side of the means 66, installed in bearings 79 is a roller 80 which is mounted on the finger 69. The roller 80 is received in the slot 68 (FIG. 5). The bearing 79 (FIG. 2) is covered by a cover 81.

The length of longitudinal travel of the sprocket 13 with the axle 14 along the latter's longitudinal axis amounts to 1 to 2 mm and is limited by a pin 82, installed in the axle 14, and a ring 83 interposed between the annular member 30 and a shoulder 84 provided on the axle 14.

Screwed at 85 (only one screw 85 is shown) to the sealed housing 3 is a boss 86. The means 66 is installed in two bearings 87 pressed to a shoulder 88 provided on the boss 86 and to a shoulder 89 provided on the means 66 with the aid of a ring 90, a cover 91 and screws 92.

The chain 12 is composed of twin runs 93 and 94 which, in combination with an axle 95, a bushing 96, a roller 97, a washer 98 and a nut 99, make it possible for the chain 12 to bend to only one side, as shown in FIG. 1.

Installed in the housing 3 (FIGS. 1 and 2) is a curvilinear guide 100. Between said guide 100 and the peripheral surface of the sprocket 13 there is a clearance 101, so that the chain 12 can transmit the pushing force to a fuel assemnly due to the fact that one of the rollers 97 abuts against the curvilinear guide 100, whereby a rigid portion of the chain 12 is produced.

The housing 3 is secured to the housing 2 (FIG. 1) by means of a flange 102 (FIG. 2) provided on the housing 3.

Figure 6:
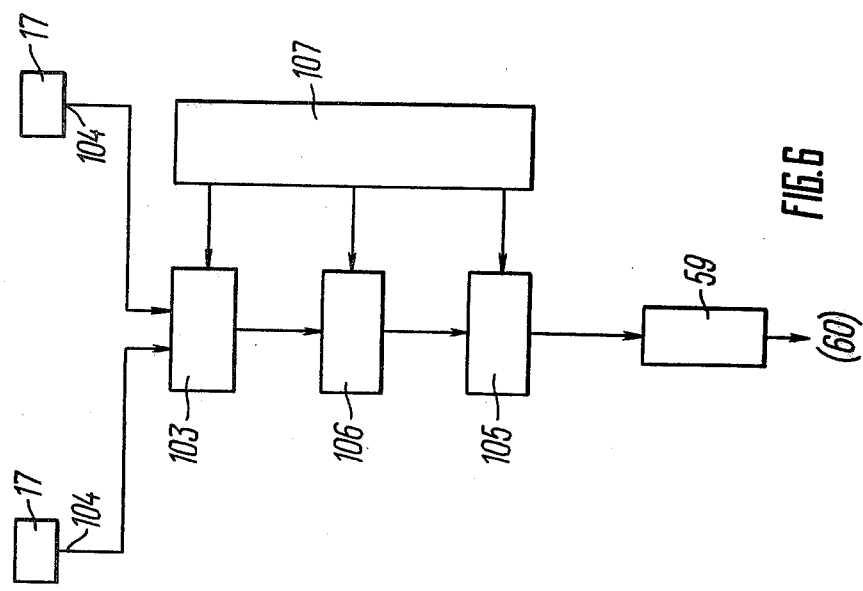
FIG. 6 is a block diagram of the control circuit for controlling the electromotor of the manipulating means drive, in accordance with the invention.

The circuit for controlling the electromotor 59 (FIG. 6) of the manipulating means drive 6 (FIG. 1) comprises, according to the invention, a comparator 103 (FIG. 6) connected by means of plug connectors 104 (shown in FIG. 6) to the force transducers 17. The comparator 103 is connected to a phase-sensitive threshold device 105 via an amplifier 106. The phase-sensitive threshold device 105 is connected to the starting circuit of the electromotor 59. The comparator 103, the phase-sensitive threshold device 105 and the amplifier 106 are connected to a power unit 107.

FIG. 1 shows an opening 108 for passage of the grip 11 with a fuel assembly being handled into and out of the reactor core.

Figure 7:
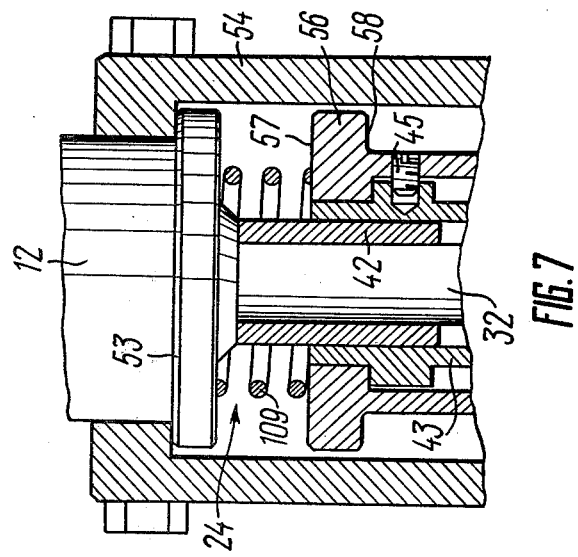
FIG. 7 is a cut-away view of an alternative embodiment of the spring suspension member of the manipulating means in accordance with the invention.

In the embodiment of the present invention, wherein the force, with which a fuel assembly is inserted in the reactor core, is greater than the load produced by the weight of the gripping means, the spring suspension member 24 (FIG. 7) includes one more spring 109 mounted on the rod 32 between the shoulder 53 of the chain 12 and the upper supporting surface 57 of the shoulder 56. The spring 109 develops a force which is somewhat in excess of the permissible force with which a fuel assembly is inserted in the reactor core.

The operating principle of the proposed manipulating means of a refuelling machine for a nuclear reactor is as follows.

The grip 11 (FIG. 1) of the manipulating means, and the fuel assembly it holds, move down through the opening 108, provided in the housing 2, into the reactor core.

The grip 11 is driven by the torque transmitting means 66 (FIG. 2) for transmitting the torque from the driving member 65 of the drive 6 to its sprocket 13; at first, the grip 11 is moved by the weight of the gripping means 5 (FIG. 1) and the fuel assembly it holds; as this takes place, the drive 6 of the gripping means 5 only serves to hold the gripping means 5 and the fuel assembly engaged with it.

At this stage of the process, the spring suspension member 24 (FIG. 3) is compressed by the weight of the gripping means 5, and the clearance 37 between the open ends of the sockets 35 and 36 is zero.

In case of any interference the movement of the fuel assembly in the reactor core, the chain 12 and the rod 32 continue to move down; the spring 33 is decompressed, and part of the weight of the gripping means 5 is taken by the fuel assembly.

As this takes place, the support reactions on the ends of the axle 14 (FIG. 2) of the sprocket 13 are reduced. The axle 14 and the sprocket 13 move in the clearances 25. Due to the connection between the end faces of the axle 14 of the sprocket 13 and the sensitive elements 26 of the force transducers 17, the decrease in the support reactions is sensed by the means 16 for regulating the forces applied to the gripping means 5, because the change in the support reactions and the resultant change in the strain of the sensitive element 26 unbalance the bridges of the wire-strain gauges, which send a signal to the comparator 103 (FIG. 6), wherefrom a signal is applied in the known manner to the operator's panel of the refuelling machine.

The movement of the rod 32 (FIG. 3) relative to the gripping means 5 continues until there is reached an equilibrium between the pushing force, produced by part of the weight of the gripping means 5, taken by the fuel assembly, and the force of resistance to the movement of the fuel assembly into the reactor core.

If the resistance increases and is in excess of the maximum pushing force equal to the weight of the gripping means 5, the spring 33 is fully decompressed, so that the clearance 37 is formed between the open ends of the sockets 35 and 36, facing each other. The width of the clearance 37 is equal to the value of compression of the spring 33 under the weight of the gripping means 5. In this case, the signal of the unbalance of the bridges of the wire-strain gauges is applied from the comparator 103 (FIG. 6) to the amplifier 106. The signal is amplified by said amplifier 106, whereupon the linear signal is converted into a relay signal by the phase-sensitive threshold device 105, wherefrom it is applied to the starting circuit of the electromotor 59, whereby said electromotor 59 is switched off.

Due to the running down of the electromotor 59, the rod 32 (FIG. 3) continues to move down relative to the gripping means 5. The distance between the shoulder 53 and the upper supporting surface 57 of the shoulder 56 is somewhat greater than the total value of the width of the clearance 37 and the length of travel of the rod 32 due to the running down of the electromotor 59. As a result, the shoulder 53 exerts no pressure upon the shoulder 56, so the force acting upon the fuel assembly is not in excess of the permissible force selected so as to keep the fuel assembly intact.

If the force with which a fuel assembly is to be inserted in the reactor core is greater than the load produced by the weight of the gripping means 5, in the course of movement of the rod 32 (FIG. 7) relative to the gripping means 5, the force is transmitted from the shoulder 53 by the spring 109 to the shoulder 56 and, consequently, to the gripping means 5.

As the electromotor 59 is switched off, there comes a moment when the spring 109 develops a force close to the permissible level; as this takes place, the rod 32 continues to move in relation to the gripping means 5.

The continuing compression of the spring 109 accounts for only a slight increase in the pushing force applied to the gripping means 5. Hence, the force acting on the fuel assembly is not in excess of the permissible value.

In order to remove a fuel assembly from the reactor core, the gripping means 5 (FIG. 1) is moved upwards by the chain 12; in this case the spring 33 (FIG. 3) is compressed, and the sockets 35 and 36 are in contact with each other with their open end faces.

In case of any interference with the movement of the fuel assembly being removed from the reactor core, the chain 12 continues to move up, but the gripping means 5 remains stationary. The vertical movement of the chain 12 is effected due to the fact that the spring suspension member 24 has the additional spring 34 mounted successively with the spring 33 on the rod 32 and developing a force which is somewhat in excess of the permissible force with which the fuel assembly is removed from the reactor core.

As the spring 34 is compressed, there is a continuous increase in the force with which the fuel assembly is removed from the reactor core; when the compression force of the spring 34 is close to the permissible value, the force transducers 17 (FIG. 2) switch off the electromotor 59 (FIG. 6) of the drive 6 of the gripping means 5, as described above.

In case the traction force has reached the permissible level, but fails to remove the fuel assembly from the reactor core, the operator of the refuelling machine switches off the force transducers 17 (FIG. 2) from the control panel on the machine. In this case the fuel assembly is withdrawn from the reactor core by continuing the movement of the chain 12 (FIG. 3) until the band 55 is engaged with the lower supporting surface 58 of the shoulder 56. It must be pointed out, however, that in this case, the fuel assembly may not remain intact.

The manipulating means of this invention makes it possible to control the force applied to the gripping means as a fuel assembly is being installed in the reactor core or removed therefrom. In addition, the manipulating means of the present invention guarantees that a fuel assembly is kept intact as it is installed in the reactor core or removed therefrom.

The proposed manipulating means also makes it possible to switch off the gripping means drive when a force applied to the gripping means is in excess of a permissible level determined by the strength characteristics of the fuel assembly being handled.

The present invention may be embodied in other specific forms without departing from the spirit or essential characteristics thereof. The present embodiments are therefore to be considered in all respects as illustrative, but not restrictive, the scope of the invention being indicated by the appended claims rather than by the foregoing description, and all changes which come within the meaning and ranges of equivalency of the claims are therefore intended to be embraced therein.

What is claimed is:

1. A manipulating means of a refuelling machine for a nuclear reactor having fuel assemblies in its core, comprising:

walls defining a sealed housing;

a gripping means for applying forces to a fuel assembly to be handled, having an end face and arranged in said housing;

a drive coupled to said gripping means for transmitting force thereto, said drive comprising an electromotor having an output shaft, a driving member coupled to said output shaft, a sprocket kinematically coupled to said driving member, an axle installed in the walls of said sealed housing with a predetermined amount of radial clearance between the walls and the axle and having first and second ends extending from said sealed housing, said sprocket being mounted on said axle, a chain in contact with said sprocket and having a first end and second end, the chain carrying said gripping means at its second end, a counter-weight attached to the first end of said chain;

means for regulating forces applied to said gripping means comprising a first force sensing transducer mounted on said sealed housing and having a sensitive element connected to the first of the two ends of said axle extending outside said sealed housing, said first force sensing transducer sensing translatory movement of said first end, a second force sensing transducer mounted on said sealed housing and having a sensitive element connected to the second of the two ends of said axle extending outside said sealed housing, said second force sensing transducer sensing translatory movement of said second end, and circuit means responsive to said first and second force sensing transducers for controlling said electromotor so that forces applied to said gripping means by said drive and forces applied by said gripping means on said fuel assembly are controlled; and a spring suspension member installed in said gripping means for absorbing a predetermined amount of force applied by said drive to said gripping means when the fuel assembly being handled encounters an obstacle to its movement.

2. A manipulating means of a refuelling machine for a nuclear reactor as claimed in claim 1, comprising a torque transmitting means for transmitting torque from said driving member of said drive to said sprocket, which torque transmitting means is arranged coaxially with and at a predetermined radial clearance in relation to said sprocket and having a radial slot on its surface facing said sprocket; a first finger mounted on the surface of said sprocket, facing said torque transmitting means, and received in said radial slot; a second finger mounted on the surface of said sprocket, facing said torque transmitting means, at a point which is diametrically opposite to the first finger, said second finger being received in said radial slot; the width of said radial slot being greater than the diameter of one of said fingers by the width of said predetermined radial clearance.

3. A manipulating means of a refuelling machine for a nuclear reactor as claimed in claim 1, comprising a first socket having an internal cavity formed by a cylindrical surface having an outer surface and a bottom, the end face of said first socket, which is opposite to its bottom, being open; the first of said two ends of said axle, extending outside said sealed housing, being received in said internal cavity of said first socket, said outer surface of said first socket being rigidly coupled to said sensitive element of said first force sensing transducer; a first flexible element connecting said open end face of said first socket to said sealed housing; a second socket having an internal cavity formed by a cylindrical surface having an outer surface and a bottom, the end face of said second socket, which is opposite to its bottom, being open; the second of said two ends of said axle, extending outside said sealed housing, being received in the internal cavity of said second socket, said outer surface of said second socket being rigidly coupled to said sensitive element of said second force transducer; and a second flexible element connecting said open end of said second socket to said sealed housing.

4. A manipulating means of a refuelling machine for a nuclear reactor as claimed in claim 1, wherein said spring suspension member includes a rod having an end face secured to the second end of said chain of said drive; a first spring compressible by the weight of said gripping means mounted on said rod; a first socket having an internal cavity formed by a cylindrical surface and a bottom having an opening to receive said rod and being in contact with said gripping means, said first socket being open on the side which is opposite to its bottom; a second socket having an internal cavity formed by a cylindrical surface and a bottom having an opening to receive said rod, said second socket being open on the side which is opposite to its bottom; said second socket being arranged so that its open end faces the open end of said first socket, a predetermined clearance being provided between said open ends of said first and second sockets; said first spring being arranged in said sockets; said predetermined clearance between the open ends of said first and second sockets being equal to the compression of said first spring under the weight of said gripping means.

5. A manipulating means of a refuelling machine for a nuclear reactor as claimed in claim 2, comprising a first socket having an internal cavity formed by a cylindrical surface having an outer surface and a bottom, the end face of said first socket, which is opposite to its bottom, being open; the first of said two ends of said axle, extending outside said sealed housing, being received in said internal cavity of said first socket, said outer surface of said first socket being rigidly coupled to said sensitive element of said first force sensing transducer; a first flexible element connecting said open end face of said first socket to said sealed housing; a second socket having an internal cavity formed by a cylindrical surface having an outer surface and a bottom, the end face of said second socket, which is opposite to its bottom, being open; the second of said two ends of said axle, extending outside said sealed housing, being received in the internal cavity of said second socket, said outer surface of said second socket being rigidly coupled to said sensitive element of said second force transducer; and a second flexible element connecting said open end of said second socket to said sealed housing.

6. A manipulating means of a refuelling machine for a nuclear reactor as claimed in claim 2, wherein said spring suspension member includes a rod having an end face secured to the second end of said chain of said drive; a first spring compressible by the weight of said gripping means mounted on said rod; a first socket having an internal cavity formed by a cylindrical surface and a bottom having an opening to receive said rod and being in contact with said gripping means, said first socket being open on the side which is opposite to its bottom; a second socket having an internal cavity formed by a cylindrical surface and a bottom having an opening to receive said rod, said second socket being open on the side which is opposite to its bottom; said second socket being arranged so that its open end faces the open end of said first socket, a predetermined clearance being provided between said open ends of said first and second sockets; said first spring being arranged in said sockets; said predetermined clearance between the open ends of said first and second sockets being equal to the compression of said first spring under the weight of said gripping means.

7. A manipulating means of a refuelling machine for a nuclear reactor as claimed in claim 3, wherein said spring suspension member includes a rod having an end face secured to the second end of said chain of said drive; a first spring compressible by the weight of said gripping means mounted on said rod; a first socket having an internal cavity formed by a cylindrical surface and a bottom having an opening to receive said rod and being in contact with said gripping means, said first socket being open on the side which is opposite to its bottom; a second socket having an internal cavity formed by a cylindrical surface and a bottom having an opening to receive said rod, said second socket being open on the side which is opposite to its bottom; said second socket being arranged so that its open end faces the open end of said first socket, a predetermined clearance being provided between said open ends of said first and second sockets; said first spring being arranged in said sockets; said predetermined clearance between the open ends of said first and second sockets being equal to the compression of said first spring under the weight of said gripping means.

8. A manipulating means of a refuelling machine for a nuclear reactor as claimed in claim 4, wherein said spring suspension member comprises a second spring successively mounted with said first spring on said rod and developing a predetermined force greater than the permissible force with which a fuel assembly is removed from said reactor core.

9. A manipulating means of a refuelling machine for a nuclear reactor as claimed in claim 4, wherein said spring suspension member includes a third spring mounted on said rod between said second end of said chain of said drive and said end face of said gripping means and developing a predetermined force greater than the permissible force with which a fuel assembly is inserted in said reactor core.

10. A manipulating means of a refuelling machine for a nuclear reactor as claimed in claim 5, wherein said spring suspension member includes a rod having an end face secured to the second end of said chain of said drive; a first spring compressible by the weight of said gripping means mounted on said rod; a first socket having an internal cavity formed by a cylindrical surface and a bottom having an opening to receive said rod and being in contact with said gripping means, said first socket being open on the side which is opposite to its bottom; a second socket having an internal cavity formed by a cylindrical surface and a bottom having an opening to receive said rod, said second socket being open on the side which is opposite to its bottom; said second socket being arranged so that its open end faces the open end of said first socket, a predetermined clearance being provided between said open ends of said first and second sockets; said first spring being arranged in said sockets; said predetermined clearance between the open ends of said first and second sockets being equal to the compression of said first spring under the weight of said gripping means.

11. A manipulating means of a refuelling machine for a nuclear reactor as claimed in claim 6, wherein said spring suspension member comprises a second spring successively mounted with said first spring on said rod and developing a predetermined force greater than the permissible force with which a fuel assembly is removed from said reactor core.

12. A manipulating means of a refuelling machine for a nuclear reactor as claimed in claim 6, wherein said spring suspension member includes a third spring mounted on said rod between said second end of said chain of said drive and said end face of said gripping means and developing a predetermined force greater than the permissible force with which a fuel assembly is inserted in said reactor core.

13. A manipulating means of a refuelling machine for a nuclear reactor as claimed in claim 7, wherein said spring suspension member comprises a second spring successively mounted with said first spring on said rod and developing a predetermined force greater than the permissible force with which a fuel assembly is removed from said reactor core.

14. A manipulating means of a refuelling machine for a nuclear reactor as claimed in claim 7, wherein said spring suspension member includes a third spring mounted on said rod between said second end of said chain of said drive and said end face of said gripping means and developing a predetermined force greater than the permissible force with which a fuel assembly is inserted in said reactor core.

15. A manipulating means of a refuelling machine for a nuclear reactor as claimed in claim 8, wherein said spring suspension member includes a third spring mounted on said rod between said second end of said chain of said drive and said end face of said gripping means and developing a predetermined force greater than the permissible force with which a fuel assembly is inserted in said reactor core.

16. A manipulating means of a refuelling machine for a nuclear reactor as claimed in claim 10, wherein said spring suspension member comprises a second spring successively mounted with said first spring on said rod and developing a predetermined force greater than the permissible force with which a fuel assembly is removed from said reactor core.

17. A manipulating means of a refuelling machine for a nuclear reactor as claimed in claim 10, wherein said spring suspension member includes a third spring mounted on said rod between said second end of said chain of said drive and said end face of said gripping means and developing a predetermined force greater than the permissible force with which a fuel assembly is inserted in said reactor core.

18. A manipulating means of a refuelling machine for a nuclear reactor as claimed in claim 11, wherein said spring suspension member includes a third spring mounted on said rod between said second end of said chain of said drive and said end face of said gripping means and developing a predetermined force greater than the permissible force with which a fuel assembly is inserted in said reactor core.

19. A manipulating means of a refuelling machine for a nuclear reactor as claimed in claim 13, wherein said spring suspension member includes a third spring mounted on said rod between said second end of said chain of said drive and said end face of said gripping means and developing a predetermined force greater than the permissible force with which a fuel assembly is inserted in said reactor core.

20. A manipulating means of a refuelling machine for a nuclear reactor as claimed in claim 16, wherein said spring suspension member includes a third spring mounted on said rod between said second end of said chain of said drive and said end face of said gripping means and developing a predetermined force greater than the permissible force with which a fuel assembly is inserted in said reactor core.

* * * * *